United States Patent
Haas

(10) Patent No.: US 7,213,999 B2
(45) Date of Patent: May 8, 2007

(54) FASTENER WITH OPPOSITE HAND THREADS FOR SECURING TWO COMPONENTS TOGETHER

(75) Inventor: David L. Haas, Elwood, IN (US)

(73) Assignee: Torque-Traction Technologies, LLC., Maumee, OH (US)

( * ) Notice: Subject to any disclaimer, the term of this patent is extended or adjusted under 35 U.S.C. 154(b) by 138 days.

(21) Appl. No.: 10/768,739

(22) Filed: Jan. 30, 2004

(65) Prior Publication Data

US 2005/0207869 A1    Sep. 22, 2005

(51) Int. Cl.
F16B 1/00 (2006.01)
F16D 1/033 (2006.01)
F16D 23/00 (2006.01)
F16D 5/06 (2006.01)

(52) U.S. Cl. .................. 403/337; 411/412; 411/413; 464/134; 464/182

(58) Field of Classification Search .......... 403/335, 403/337; 464/182, 134; 411/412, 413, 389
See application file for complete search history.

(56) References Cited

U.S. PATENT DOCUMENTS

| 600,748 | A | | 3/1898 | Smart | |
|---|---|---|---|---|---|
| 831,009 | A | | 9/1906 | Knopf | |
| 1,035,118 | A | | 8/1912 | Goldsman | |
| 1,426,319 | A | | 8/1922 | Randals | |
| 1,576,413 | A | | 3/1926 | Cubitt | |
| 2,019,049 | A | | 10/1935 | Hoke | |
| 2,036,978 | A | * | 4/1936 | Anderson | 384/564 |
| 2,212,763 | A | * | 8/1940 | Wollner | 464/130 |
| 2,228,715 | A | * | 1/1941 | Wollner | 464/130 |
| 2,358,505 | A | * | 9/1944 | Greiner | 464/129 |
| 3,124,031 | A | | 3/1964 | Knohl | |
| 3,204,428 | A | * | 9/1965 | Stokely | 464/130 |
| 3,358,548 | A | * | 12/1967 | Dyslin | 411/387.2 |
| 3,423,958 | A | * | 1/1969 | Koelling | 464/12 |

(Continued)

FOREIGN PATENT DOCUMENTS

AT    385476    4/1988

(Continued)

*Primary Examiner*—Daniel P. Stodola
*Assistant Examiner*—Nahid Amiri
(74) *Attorney, Agent, or Firm*—MacMillan, Sobanski & Todd, LLC

(57) ABSTRACT

A threaded fastener has opposite hand threads provided thereon for securing two components together, such as a companion flange and a flange yoke assembly that is used in a vehicular drive train system. The companion flange includes a hollow cylindrical sleeve portion and a disc-shaped flange portion having an aperture formed therethrough. The flange yoke includes a disc-shaped flange portion and a yoke portion having an aperture formed therethrough. The flange yoke aperture is aligned with the companion flange aperture. A threaded fastener extends through the companion flange aperture and the flange yoke aperture. The threaded fastener includes a first threaded portion having a first hand that is disposed within the companion flange aperture. The threaded fastener further includes a second threaded portion having a second hand that is disposed within the flange yoke aperture. The first hand is opposite to said second hand such that when a nut is screwed onto the threaded fastener to secure the companion flange and flange yoke together, the threaded fastener is effectively prevented from rotating.

20 Claims, 4 Drawing Sheets

U.S. PATENT DOCUMENTS

| | | | |
|---|---|---|---|
| 3,545,232 A * | 12/1970 | Neese et al. | 464/131 |
| 3,726,577 A * | 4/1973 | Faulbecker | 384/564 |
| 4,702,722 A * | 10/1987 | Narue et al. | 464/93 |
| 5,299,860 A | 4/1994 | Anderson | |
| 5,401,062 A * | 3/1995 | Vowles | 285/12 |
| 5,544,991 A | 8/1996 | Richardson | |
| 6,077,012 A * | 6/2000 | Granese et al. | 411/361 |
| 6,125,526 A | 10/2000 | Wierzchon | |
| 6,666,638 B2 * | 12/2003 | Craven | 411/413 |
| 6,855,060 B2 * | 2/2005 | Breese et al. | 464/130 |
| 6,893,349 B2 * | 5/2005 | Krugman et al. | 464/23 |
| 6,907,667 B2 * | 6/2005 | Joyner et al. | 29/898.07 |

FOREIGN PATENT DOCUMENTS

| | | |
|---|---|---|
| GB | 747910 | 4/1956 |

* cited by examiner

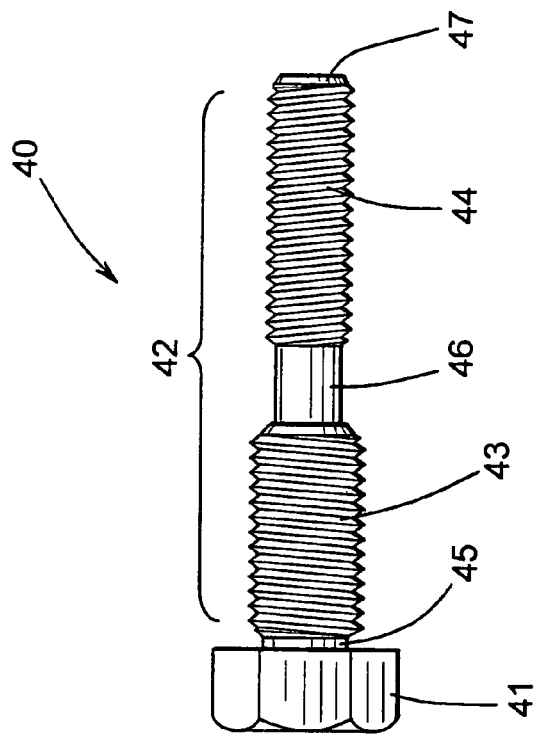
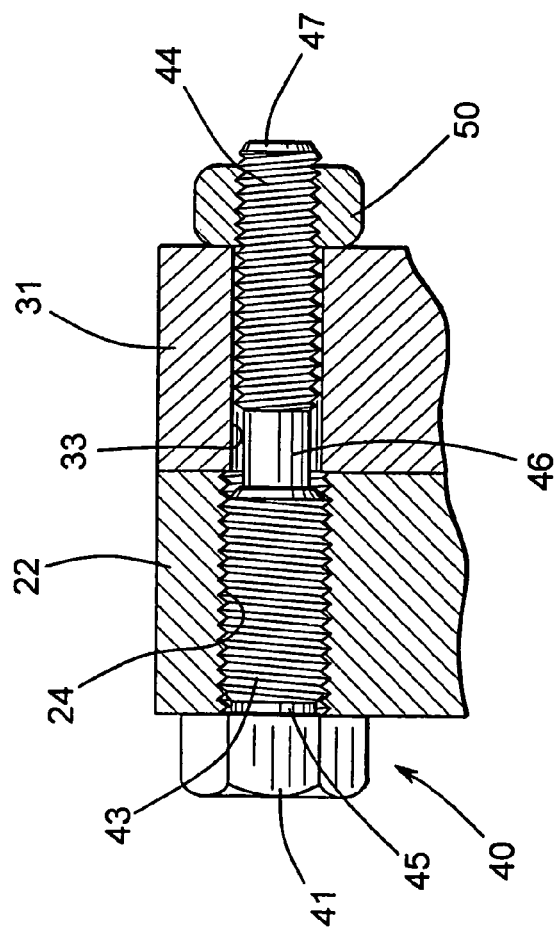
FIG. 5
FIG. 4

# US 7,213,999 B2

FASTENER WITH OPPOSITE HAND THREADS FOR SECURING TWO COMPONENTS TOGETHER

BACKGROUND OF THE INVENTION

This invention relates in general to fasteners for securing two components together. More specifically, this invention relates to an improved structure for a threaded fastener having opposite hand threads provided thereon for securing two components together, such as a companion flange and a flange yoke that is used in a vehicular drive train system.

Drive train systems are widely used for generating power from a source and for transferring such power from the source to a driven mechanism. For example, in most land vehicles in use today, an engine/transmission assembly generates rotational power, and such rotational power is transferred from an output shaft of the engine/transmission assembly through a driveshaft assembly to an input shaft of an axle assembly so as to rotatably drive the wheels of the vehicle. To accomplish this, a typical driveshaft assembly includes a hollow cylindrical driveshaft tube having a pair of end fittings, such as a pair of tube yokes, secured to the front and rear ends thereof. The front end fitting forms a portion of a front universal joint that connects the output shaft of the engine/transmission assembly to the front end of the driveshaft tube. Similarly, the rear end fitting forms a portion of a rear universal joint that connects the rear end of the driveshaft tube to the input shaft of the axle assembly. The front and rear universal joints provide a rotational driving connection from the output shaft of the engine/transmission assembly through the driveshaft tube to the input shaft of the axle assembly, while accommodating a limited amount of angular misalignment between the rotational axes of these three shafts.

A companion flange and flange yoke assembly is often used to connect the output shaft of the engine/transmission assembly to the front universal joint or to connect the rear universal joint to the input shaft of the axle assembly. A typical companion flange and flange yoke assembly includes a companion flange and a flange yoke that are secured together for concurrent rotational movement. The companion flange includes a hollow cylindrical, internally splined sleeve portion that engages the shaft for rotation therewith, while the flange yoke includes a yoke portion that forms a portion of the associated universal joint. The companion flange and the flange yoke are typically secured together using fasteners that extend through aligned apertures formed through mating flange portions of the companion flange and the flange yoke. Respective nuts are threaded onto the ends of the threaded fasteners to retain the companion flange and the flange yoke together during use.

In order to insure that the companion flange and the flange yoke are reliably secured together, it is important that the nuts are tightly rotated onto the ends of the threaded fasteners. Because of the relatively large amount of torque that is usually needed to be applied to such nuts during installation, it is often necessary to positively prevent the threaded fasteners from rotating while the nuts are being tightened thereon. The simplest method of accomplishing this would be to use a wrench or other tool to engage conventional heads on the threaded fasteners to prevent them from rotating when the nuts are tightened thereon. However, such a method has been found to be somewhat awkward and difficult because of space constraints, and further is relatively time consuming in the context of the high volume production of vehicular drive train systems. A more recent method has been to provide a knurled portion on each of the threaded fasteners that frictionally engages either the companion flange or the flange yoke in an attempt to prevent the threaded fasteners from rotating when the nuts are tightened thereon. Although much simpler and quicker than using a wrench or similar tool, these knurled structures have, at least in some instances, been found to provide an insufficient amount of resistance to prevent the threaded fasteners from rotating when the nuts are tightened thereon. Thus, it would be desirable to provide an improved structure for a threaded fastener for use in a companion flange and flange yoke yoke assembly that more effectively prevents the threaded fasteners from rotating when the nuts are tightened thereon.

SUMMARY OF THE INVENTION

This invention relates to an improved structure for a threaded fastener having opposite hand threads provided thereon for securing two components together, such as a companion flange and a flange yoke assembly that is used in a vehicular drive train system. The companion flange includes a hollow cylindrical sleeve portion and a disc-shaped flange portion having an aperture formed therethrough. The flange yoke includes a disc-shaped flange portion and a yoke portion having an aperture formed therethrough. The flange yoke aperture is aligned with the companion flange aperture. A threaded fastener extends through the companion flange aperture and the flange yoke aperture. The threaded fastener includes a first threaded portion having a first hand that is disposed within the companion flange aperture. The threaded fastener further includes a second threaded portion having a second hand that is disposed within the flange yoke aperture. The first hand is opposite to said second hand such that when a nut is screwed onto the threaded fastener to secure the companion flange and flange yoke together, the threaded fastener is effectively prevented from rotating.

Various objects and advantages of this invention will become apparent to those skilled in the art from the following detailed description of the preferred embodiment, when read in light of the accompanying drawings.

BRIEF DESCRIPTION OF THE DRAWINGS

FIG. 4 is a further enlarged sectional elevational view of a portion of the companion flange and flange yoke assembly illustrated in FIGS. 1, 2, and 3.

FIG. 5 is a further enlarged side elevational view of one of the fasteners used in the companion flange and flange yoke assembly illustrated in FIGS. 1 through 4.

DETAILED DESCRIPTION OF THE PREFERRED EMBODIMENT

Figure 1:
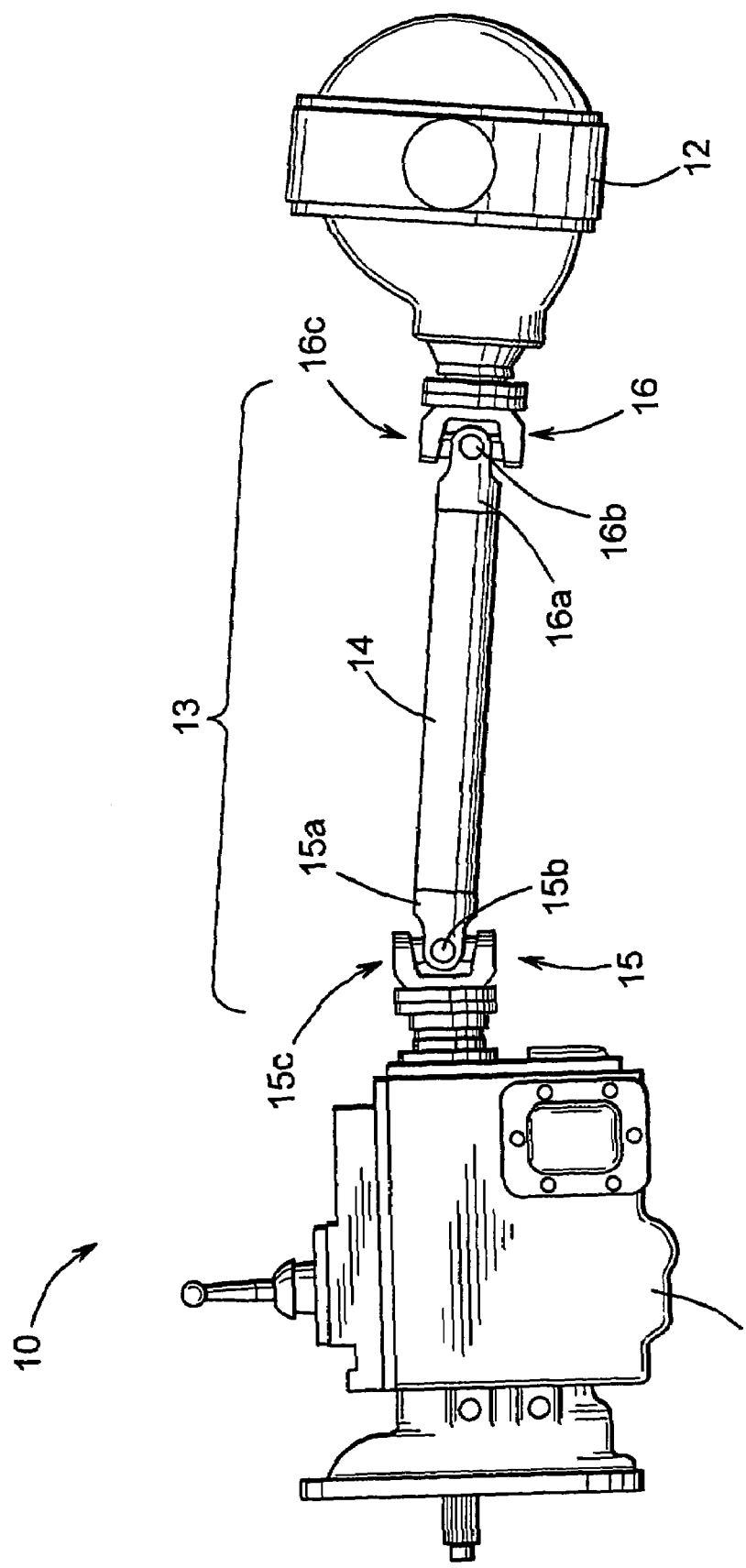
FIG. 1 is a side elevational view schematically illustrating a vehicle drive train system including a companion flange and flange yoke assembly that is secured together in accordance with this invention.

Referring now to the drawings, there is illustrated in FIG. 1 a vehicle drive train system, indicated generally at 10, in accordance with this invention. The illustrated vehicle drive train system 10 is, in large measure, conventional in the art and is intended merely to illustrate one environment in which this invention may be used. Thus, the scope of this invention is not intended to be limited for use with the specific structure for the vehicle drive train system 10 illustrated in FIG. 1 or with vehicle drive train systems in general. On the contrary, as will become apparent below, this invention may be used in any desired environment for the purpose of securing two components together.

Figure 2:
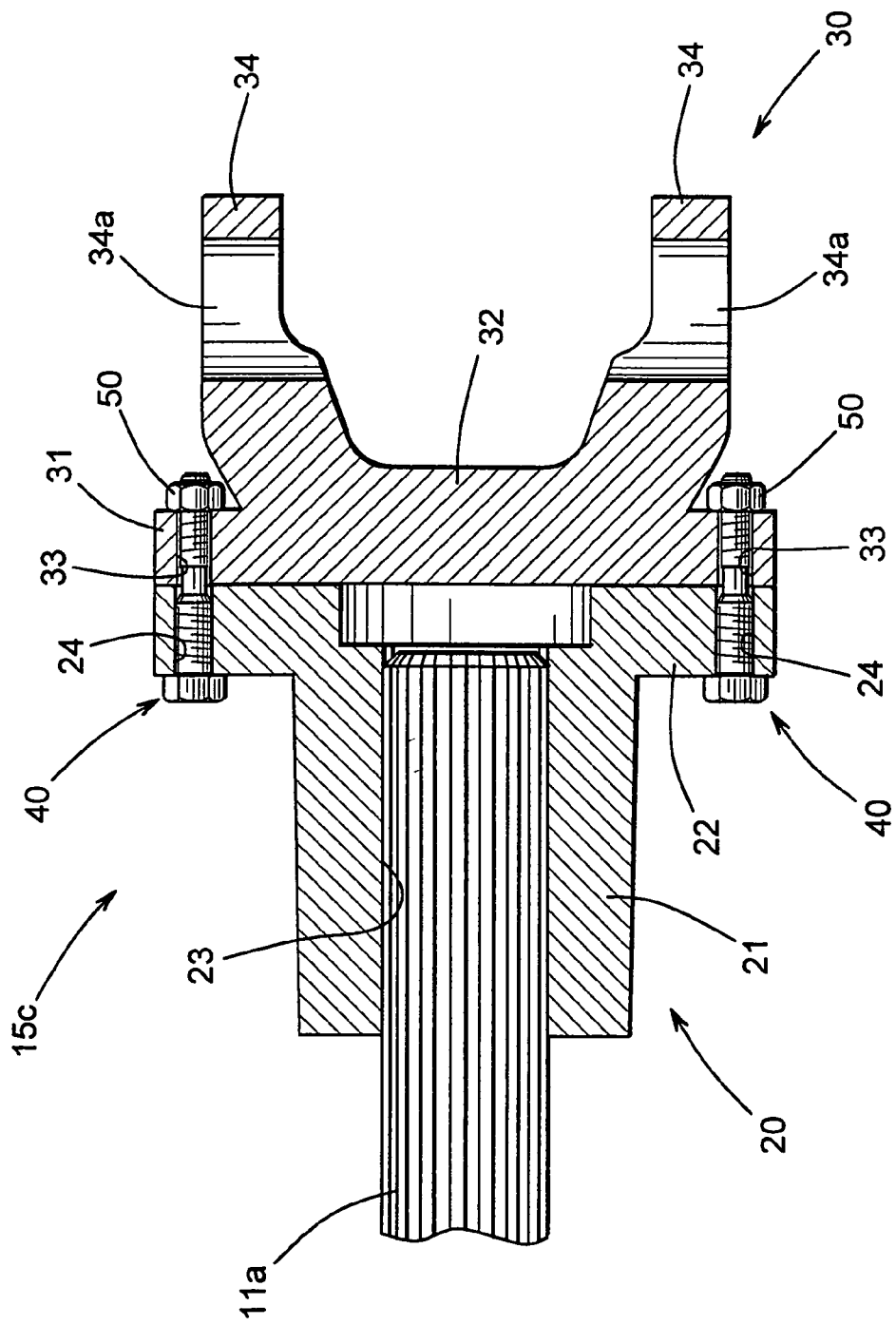
FIG. 2 is an enlarged sectional elevational view of the companion flange and flange yoke assembly illustrated in FIG. 1.

The illustrated drive train system 10 includes a transmission 11 having an output shaft (such as a male splined shaft 11a, as shown in FIG. 2) that is connected to an input shaft (not shown) of an axle assembly 12 through a driveshaft assembly 13. The transmission 11 is rotatably driven by an engine (not shown) that generates rotational power in a conventional manner. The driveshaft assembly 13 includes a cylindrical driveshaft tube 14 having a center portion and a pair of opposed end portions. The output shaft 11a of the transmission 11 and the input shaft of the axle assembly 12 are typically not co-axially aligned. To accommodate this, a pair of universal joints, indicated generally at 15 and 16, are provided to respectively connect the end portions of the driveshaft tube 14 to the output shaft 11a of the transmission 11 and to the input shaft of the axle assembly 12. The first and second universal joints 15 and 16 provide a rotational driving connection from the output shaft 11a of the transmission 11 through the driveshaft tube 14 to the input shaft of the axle assembly 12, while accommodating a limited amount of angular misalignment between the rotational axes of these three shafts.

The first universal joint 15 includes a tube yoke 15a that is secured to the forward end portion of the driveshaft tube 14 by any conventional means, such as by welding. The first universal joint 15 further includes a journal cross 15b that is connected to the tube yoke 15a in a conventional manner. Lastly, the first universal joint 15 includes a companion flange and flange yoke assembly, indicated generally at 15c, that is connected between the output shaft 11a of the transmission 11 and the cross 15b. The structure of the companion flange and flange yoke assembly 15c will be described in detail below. Similarly, the second universal joint 16 includes a tube yoke 16a that is secured to the rearward end portion of the driveshaft tube 14 by any conventional means, such as by welding. The second universal joint 16 further includes a journal cross 16b that is connected to the tube yoke 16a in a conventional manner. Lastly, the second universal joint 16 includes a companion flange and flange yoke assembly, indicated generally at 16c, that is connected between the cross 16b and the input shaft of the axle assembly 12. The structure of the companion flange and flange yoke assembly 16c can be identical to the companion flange and flange yoke assembly 15c, although such is not required.

Figure 3:
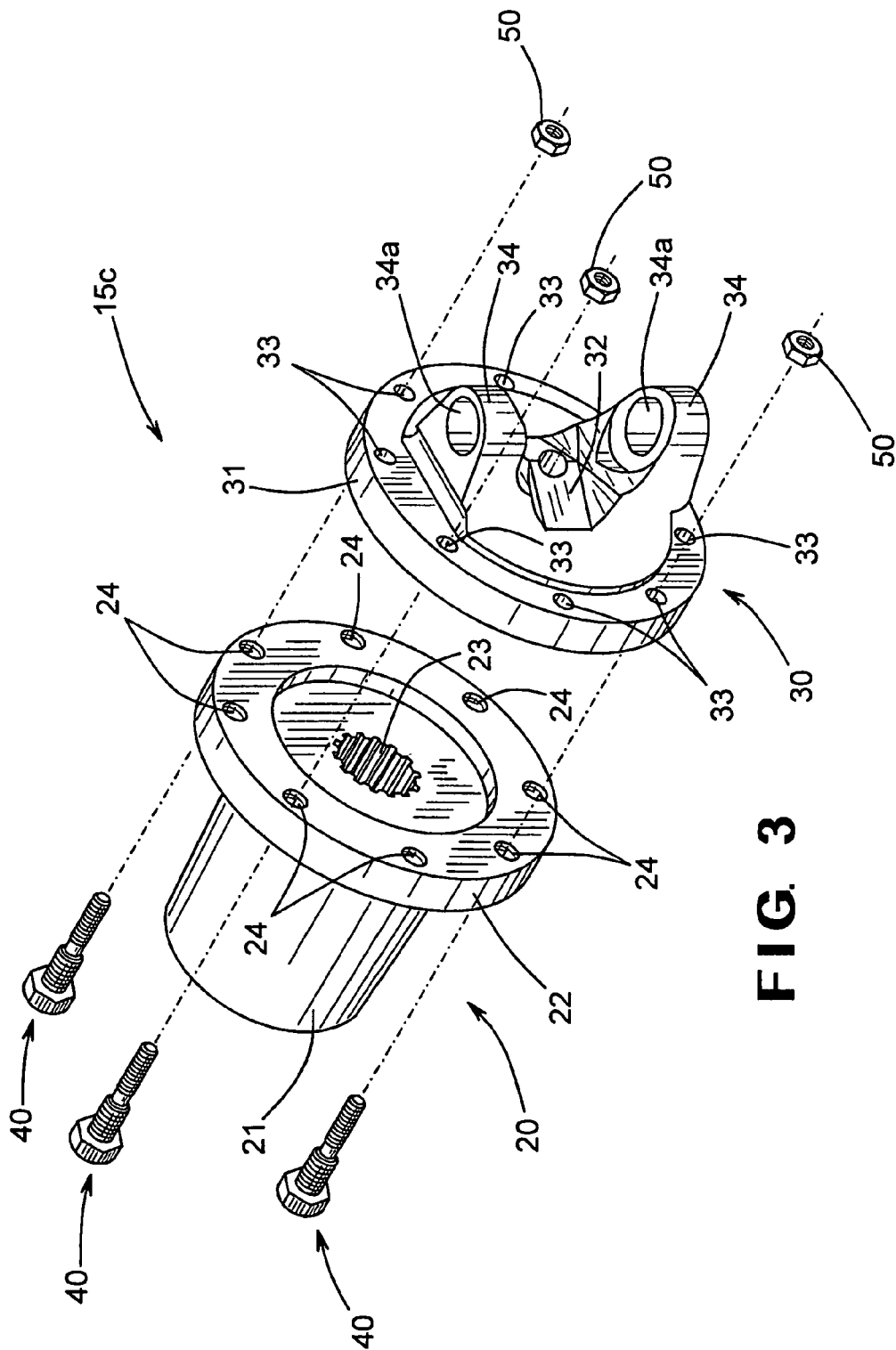
FIG. 3 is an exploded perspective view of the companion flange and flange yoke assembly illustrated in FIGS. 1 and 2.

As best shown in FIGS. 2 and 3, the companion flange and flange yoke assembly 15c includes a companion flange, indicated generally at 20, and a flange yoke, indicated generally at 30, that are secured together for concurrent rotational movement. The illustrated companion flange 20 includes a hollow cylindrical sleeve portion 21 and a disc-shaped flange portion 22. The hollow sleeve portion 21 of the companion flange 20 has a plurality of inwardly extending splines 23 formed on an inner surface thereof that cooperate with a corresponding plurality of outwardly extending splines formed on the male member output shaft 11a. Thus, the sleeve portion 21 of the companion flange 20 is connected to the output shaft 11a of the transmission 11 for rotational movement, while accommodating a limited amount of relative axial movement therebetween. The flange portion 22 of the companion flange 20 is formed integrally with the sleeve portion 21 (although such is not required) and has a plurality of axially extending apertures 24 formed therethrough. In the illustrated embodiment, eight equidistantly spaced apertures 24 are formed through the flange portion 22 of the companion flange 20. However, any desired number of such apertures 24 may be formed through any desired locations on the flange portion 22 of the companion flange 20.

The illustrated flange yoke 30 includes a disc-shaped flange portion 31 and a yoke portion 32. The flange portion 31 of the flange yoke 30 has a plurality of axially extending apertures 33 formed therethrough. In the illustrated embodiment, eight equidistantly spaced apertures 33 are formed through the flange portion 31 of the flange yoke 30. However, any desired number of such apertures 33 may be formed through any desired locations on the flange portion 31 of the flange yoke 30. Preferably, however, the apertures 33 formed through the flange portion 31 of the flange yoke 30 correspond in number, size, and location with the apertures 24 are formed through the flange portion 22 of the companion flange 20. The yoke portion 32 of the flange yoke 30 is formed integrally with the flange portion 31 (although such is not required) and has a pair of spaced apart yoke arms 34 formed thereon. Respective apertures 34a are formed through the yoke arms 34 of the yoke portion 32. The apertures 34a are aligned with one another and are adapted to support the journal cross 15b of the first universal joint 15 in a well known manner.

A plurality of threaded fasteners, each indicated generally at 40, is provided to secure the companion flange 20 and the flange yoke 30 to form the companion flange and flange yoke assembly 15c. In the illustrated embodiment, one of the threaded fasteners 40 is provided for each one of the aligned pairs of the apertures 24 formed through the flange portion 22 of the companion flange 20 and the apertures 33 formed through the flange portion 31 of the flange yoke 30. Thus, as shown in FIGS. 2, 3, and 4, the threaded fasteners 40 can extend respectively through such aligned apertures 24 and 33 to secure the companion flange 20 and the flange yoke 30 to form the companion flange and flange yoke assembly 15c.

The structure of one of the threaded fasteners 40 is illustrated in detail in FIGS. 4 and 5. As shown therein, the threaded fastener 40 includes a head 41 and a shank 42. In the illustrated embodiment, the portion 41 is formed having a conventional hexagonal shape. However, the head 41 may be formed having any desired size and shape to facilitate the rotation of the threaded fastener 40 during the installation process, as described below. The shank 42 of the threaded fastener 40 includes a first threaded portion 43 and a second threaded portion 44. The first threaded portion 43 extends axially from the head 41 of the threaded fastener 40, while the second threaded portion 44 extends axially from the first threaded portion 41. The relative lengths of the first and second threaded portions 43 and 44 can be varied as desired, typically in accordance with the thicknesses of the flange portion 22 of the companion flange 20 and the flange portion 31 of the flange yoke 30, as will become apparent below. If desired, one or more non-threaded regions 45 may be provided on the shank 42. For example, as best shown in FIG. 4, a first non-threaded region 45 can be provided between the head 41 and the first threaded portion 43, a second non-threaded region 46 can be provided between the first threaded portion 43 and the second threaded portion 44, and a third non-threaded region 47 can be provided at the end of the shank 42.

The hand or helical direction of the thread defined by the first threaded portion 43 of the threaded fastener 40 is opposite to the hand or helical direction of the thread defined by the second threaded portion 44 of the threaded fastener 40. Thus, for example, if the thread defined by the first threaded portion 43 is a left-hand thread (i.e., a thread that advances helically in a clockwise direction as it advances axially along the shank 42 away from the head 41), then the thread defined by the second threaded portion 44 can be a right-hand thread (i.e., a thread that advances helically in a counter-clockwise direction as it advances axially along the shank 42 away from the head 41). Alternatively, if the thread defined by the first threaded portion 43 is a right-hand thread, then the thread defined by the second threaded portion 44 can be a left-hand thread. For reasons that will be explained below, the outer diameter of the first threaded portion 43 is preferably somewhat larger than the outer diameter of the second threaded portion 44. The pitch (i.e., the length of a complete turn of the thread as measured along the axis) of each of the first and second threaded portions 43 and 44 can be set as desired. The pitches of the first and second threaded portions 43 and 44 can be the same or different from one another, as desired.

The companion flange and flange yoke assembly 15*c* can be assembled in any desired manner. Preferably, however, the companion flange and flange yoke assembly 15*c* is assembled by initially inserting the shanks 42 of the threaded fasteners 40 respectively through the axially extending apertures 24 formed through the flange portion 22 of the companion flange 20. As best shown in FIG. 4, the outer diameter defined by the first threaded portion 43 of each of the threaded fasteners 40 is preferably approximately the same as or slightly larger than the inner diameter of the associated aperture 24 formed through the flange portion 22 of the companion flange 20. Thus, when each of the threaded fasteners 40 is inserted through the aperture 24 formed through the flange portion 22 of the companion flange 20, the first threaded portion 43 thereof is received within the associated aperture 24 in a press fit relationship. This insertion of the threaded fastener 40 is facilitated when the outer diameter of the second threaded portion 44 of the shank 42 is somewhat smaller than the outer diameter of the first threaded portion 43, as mentioned above. Thus, the second threaded portions 44 of the threaded fasteners 40 preferably do not engage the inner surfaces of the apertures 24 formed through the flange portion 22 of the companion flange 20 and, accordingly, do not resist being inserted through the apertures 24. Such insertions of the threaded fasteners 40 preferably continue until the heads 41 thereof abut the flange portion 22 of the companion flange 20, as shown in FIG. 4.

Next, the apertures 33 formed through the flange portion 31 of the flange yoke 30 are co-axially aligned with the apertures 24 formed through the flange portion 22 of the companion flange 20, as shown in FIG. 3. Then, the companion flange 20 and the flange yoke 30 are moved toward one another such that the shanks 42 of the threaded fasteners 40 are inserted through the apertures 33 formed through the flange portion 31 of the flange yoke 30, as shown in FIGS. 2 and 4. As best shown in FIG. 4, the outer diameter of the second threaded portion 44 of each of the shanks 42 is preferably slightly smaller than the inner diameter of the associated aperture 33 formed through the flange portion 31 of the flange 30. Thus, the second threaded portions 44 of the shanks 42 preferably do not engage the inner surfaces of the apertures 33 formed through the flange portion 31 of the flange 30 and, accordingly, do not resist such insertions.

To complete the assembly process, a nut 50 is threaded onto the end of each of the second threaded portions 44 of the shanks 42 of the threaded fasteners 40 to secure the companion flange 20 to the flange yoke 30. The nuts 50 may be of any suitable size and shape to cooperate with the second threaded portions 44 of the threaded fasteners 40 in a conventional manner. As each of the nuts 50 is tightened on the associated shank 42, friction between the cooperating threads on the nut 50 and the second threaded portion 44 of the shank 42 causes a rotational force to be exerted against the threaded fastener 40. The direction of the rotational force exerted against the threaded fastener 40 is the same as the direction of the thread provided on the second threaded portion 44 thereof. Thus, if the thread defined by the second threaded portion 44 is a right-hand thread, then a counter-clockwise rotational force will be exerted on the threaded fastener 40.

Because of the opposite hand relationship between the first threaded portion 43 and the second threaded portion 44 of the threaded fastener 40, the rotational force caused by the tightening of the nut 40 will tend to cause the first threaded portion 43 of the threaded fastener 40 to be screwed further into the flange portion 22 of the companion flange 20. However, because of the abutment of the head 41 of the threaded fastener 40 with the flange portion 22 of the companion flange 20, rotation of the threaded fastener 40 is effectively prevented. Thus, the opposite hand structure of the first and second threaded portions 43 and 44 of the threaded fasteners 40 effectively prevents the threaded fasteners 40 from rotating when the nuts 50 are tightened thereon.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An assembly comprising:
   a first component including a portion having an aperture formed therethrough;
   a second component including a portion having an aperture formed therethrough, said second component aperture being aligned with said first component aperture; and
   a threaded fastener extending through said first component aperture and said second component aperture, said threaded fastener including a first threaded portion having a first hand that is disposed within said first component aperture and a second threaded portion having a second hand that is disposed within said second component aperture, said first hand being opposite to said second hand, said first threaded portion of said threaded fastener engaging said first component aperture in a press fit relationship.

2. The assembly defined in claim 1 wherein said first threaded portion of said threaded fastener defines an outer diameter that is approximately the same as or slightly larger than an inner diameter defined by said first component aperture.

3. The assembly defined in claim 1 wherein said second threaded portion of said threaded fastener defines an outer diameter that is less than an inner diameter defined by said second component aperture.

4. The assembly defined in claim 1 wherein said first threaded portion of said threaded fastener defines an outer diameter that is approximately the same as or slightly larger than an inner diameter defined by said first component aperture, and said second threaded portion of said threaded fastener defines an outer diameter that is less than an inner diameter defined by said second component aperture.

5. The assembly defined in claim 1 further including a nut that is threaded onto said second threaded portion of said threaded fastener.

6. The assembly defined in claim 1 wherein said threaded fastener includes a head that abuts said portion of said first component, and further including a nut that is threaded onto said second threaded portion of said threaded fastener and abuts said portion of said second component.

7. The assembly defined in claim 1 wherein said portion of said first component has a plurality of apertures formed therethrough that includes said first component aperture, said portion of said second component has a plurality of apertures formed therethrough that includes said second component aperture, said plurality of second component apertures are aligned with said plurality of first component apertures, and a threaded fastener extends through each of said aligned pluralities of said first component apertures and said second component apertures.

8. The assembly defined in claim 7 wherein each of said threaded fasteners includes a first threaded portion having a first hand that is disposed within said first component aperture and a second threaded portion having a second hand that is disposed within said second component aperture, each of said first hands being opposite to each of said second hands.

9. The assembly defined in claim 8 wherein each of said first threaded portions of said threaded fasteners defines an outer diameter that is approximately the same as or slightly larger than an inner diameter defined by said first component apertures, and each of said second threaded portions of said threaded fasteners defines an outer diameter that is less than an inner diameter defined by said second component apertures.

10. The assembly defined in claim 8 further including a nut that is threaded onto each of said second threaded portions of said threaded fasteners.

11. A companion flange and flange yoke assembly comprising:
a companion flange including a hollow cylindrical sleeve portion and a disc-shaped flange portion having an aperture formed therethrough;
a flange yoke including a disc-shaped flange portion and a yoke portion having an aperture formed therethrough, said flange yoke aperture being aligned with said companion flange aperture; and
a threaded fastener extending through said companion flange aperture and said flange yoke aperture, said threaded fastener including a first threaded portion having a first hand that is disposed within said companion flange aperture and a second threaded portion having a second hand that is disposed within said flange yoke aperture, said first hand being opposite to said second hand, said first threaded portion of said threaded fastener engaging said first component aperture in a press fit relationship.

12. The companion flange and flange yoke assembly defined in claim 11 wherein said first threaded portion of said threaded fastener defines an outer diameter that is approximately the same as or slightly larger than an inner diameter defined by said companion flange aperture.

13. The companion flange and flange yoke assembly defined in claim 11 wherein said second threaded portion of said threaded fastener defines an outer diameter that is less than an inner diameter defined by said flange yoke aperture.

14. The companion flange and flange yoke assembly defined in claim 11 wherein said first threaded portion of said threaded fastener defines an outer diameter that is approximately the same as or slightly larger than an inner diameter defined by said companion flange aperture, and said second threaded portion of said threaded fastener defines an outer diameter that is less than an inner diameter defined by said flange yoke aperture.

15. The companion flange and flange yoke assembly defined in claim 11 further including a nut that is threaded onto said second threaded portion of said threaded fastener.

16. The companion flange and flange yoke assembly defined in claim 11 wherein said threaded fastener includes a head that abuts said portion of said companion flange, and further including a nut that is threaded onto said second threaded portion of said threaded fastener and abuts said portion of said flange yoke.

17. The companion flange and flange yoke assembly defined in claim 11 wherein said companion flange includes a portion having a plurality of apertures formed therethrough, said flange yoke includes a portion having a plurality of apertures formed therethrough, said plurality of flange yoke apertures are aligned with said plurality of companion flange apertures, and a threaded fastener extends through each of said aligned companion flange apertures and said flange yoke apertures.

18. The companion flange and flange yoke assembly defined in claim 17 wherein each of said threaded fasteners includes a first threaded portion having a first hand that is disposed within said companion flange aperture and a second threaded portion having a second hand that is disposed within said flange yoke aperture, each of said first hands being opposite to each of said second hands.

19. The companion flange and flange yoke assembly defined in claim 18 wherein each of said first threaded portions of said threaded fasteners defines an outer diameter that is approximately the same as or slightly larger than an inner diameter defined by said companion flange apertures, and each of said second threaded portions of said threaded fasteners defines an outer diameter that is less than an inner diameter defined by said flange yoke apertures.

20. The companion flange and flange yoke assembly defined in claim 18 further including a nut that is threaded onto each of said second threaded portions of said threaded fasteners.

* * * * *